(12) United States Patent
Steele

(10) Patent No.: US 6,305,412 B1
(45) Date of Patent: Oct. 23, 2001

(54) DOUBLE ACTING PRESSURE RELIEF VALVE WITH LOW PRESSURE SEAL

(75) Inventor: James R. Steele, Stillwater, MN (US)

(73) Assignee: Dynamic Air Inc., St. Paul, MN (US)

(*) Notice: Subject to any disclaimer, the term of this patent is extended or adjusted under 35 U.S.C. 154(b) by 0 days.

(21) Appl. No.: 09/534,608

(22) Filed: Mar. 27, 2000

(51) Int. Cl.⁷ .................................................. F16K 17/26
(52) U.S. Cl. ................................ 137/493.4; 157/493.5; 157/493.6; 157/493.8; 157/554; 157/852; 157/853; 157/854
(58) Field of Search ................................ 137/554, 493.4, 137/493.5, 493.6, 493.8, 852, 853, 854

(56) References Cited

U.S. PATENT DOCUMENTS

| | | | | |
|---|---|---|---|---|
| 3,722,535 | * | 3/1973 | Raupp | 137/493.4 |
| 3,974,850 | * | 8/1976 | Pierson | 137/493.9 |
| 5,226,442 | * | 7/1993 | Taylor | 137/70 |
| 5,975,131 | * | 11/1999 | Theisen et al. | 137/554 |

OTHER PUBLICATIONS

Brochure on bulk Materials handling and processing by Wamgroup.
Brochure on Enardo Model 660 thief hatch, Enardo Manufacturing.
Brochure Oil equipment fittings, Clay and Bailey Mfg. Co.

* cited by examiner

Primary Examiner—A. Michael Chambers
Assistant Examiner—Thomas L. McShane
(74) Attorney, Agent, or Firm—Jacobson & Johnson

(57) ABSTRACT

A pressure relief valve that includes a sealing arrangement with a cantilevered seal that prevents fluid from escaping from a system if the differential pressure is only slightly positive yet permits fluid to be released from the system if the internal system pressure exceeds a predetermined pressure differential. In a further embodiment, the pressure relief valve includes a further sealing arrangement with a further cantilevered seal, which is normally closed, but if the internal system pressure should decrease below the external pressure a predetermined amount the second sealing arrangement opens to allow fluid into the system to thereby equalize the pressure and thereby prevent collapse of the system.

21 Claims, 5 Drawing Sheets

DOUBLE ACTING PRESSURE RELIEF VALVE WITH LOW PRESSURE SEAL

FIELD OF THE INVENTION

This invention relates generally to pressure relief valves and, more specifically, in one embodiment to a pressure relief valve that can quickly vent unwanted pressure from a system yet can reseal with extremely low differential pressures to prevent leakage of fluid from the system and in a second embodiment to a pressure relief valve that allows fluid to enter the system to equalize the differential pressure forces.

BACKGROUND OF THE INVENTION

The concept of pressure relief valves is known in the art. Generally, pressure relief valves have a pressure responsive mechanism that senses when the fluid pressure in a system has exceeded a predetermined pressure. When the predetermined pressure is exceeded, the relief valve opens to allow fluid to escape and consequently allow the internal system pressure to decrease to a safe condition. One of the difficulties with pressure relief valves is that even though the valve may function property to allow high pressure fluid to escape from the system it is difficulty to seal the valve or maintain the valve in a sealed condition if the normal operating pressure difference between the external system pressure and the internal system pressure is low, for example a pressure differential on the order of a few inches of water. When the internal system pressure decreases to a condition where the internal system pressure is only slightly greater than the external system pressure there is a tendency for the pressure relief valve seals to leak thus allowing fluid to slowly escape from the system. Generally, a one time discharge of fluid when the system is over pressurized condition can create a nuisance but can be dealt with. On the other hand, if the pressure relief valve cannot seal properly at low pressure differentials one may have a continuous release of fluidized materials from the system. If the system contain harmful or toxic materials a continuous release creates a hazardous condition. The present invention provides a pressure relief valve with a first sealing member in a cantilevered sealing arrangement that allows the pressure relief valve to seat and remain seated at extremely low differential pressures, yet allows the pressure relief valve to open to discharge fluid if the differential pressure exceeds a predetermined differential pressure.

In addition, in a further embodiment of the invention the pressure relief valve includes a second sealing member in a second cantilevered scaling arrangement with the second sealing member maintained in a sealing condition when the internal system pressure exceeds the external system pressure but if the external system pressure exceeds the internal system pressure by a second predetermined pressure the second sealing arrangement allows the second sealing member to open to allow fluid to enter the system thereby equalizing the fluid pressure differential forces in the system.

SUMMARY OF THE INVENTION

Briefly, the present invention comprises a pressure relief valve that includes a sealing arrangement with a cantilevered seal that prevents fluid from escaping from a system if the differential pressure is only slightly positive yet permits fluid to be released from the system if the internal system pressure exceeds a first predetermined differential pressure. In a further embodiment, the pressure relief valve includes a further sealing arrangement with a further cantilevered seal, which is normally closed, but if the internal system pressure should decrease below the external pressure to a second predetermined differential pressure the second scaling arrangement opens to allow fluid into the system to thereby equalize the pressure between the inside and the outside of the system.

DESCRIPTION OF THE PREFERRED EMBODIMENT

Figure 1:
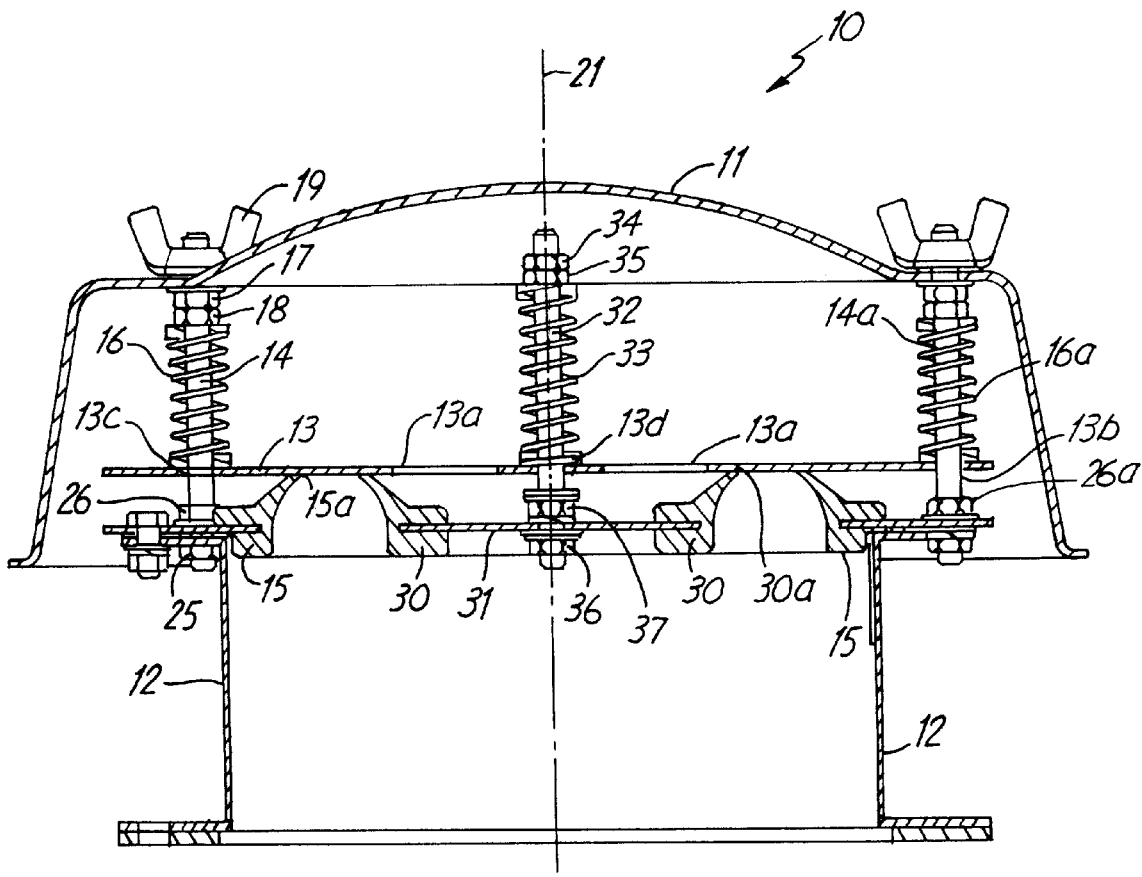
FIG. 1 is cross sectional view of a pressure relief valve of the present invention in the closed condition.

FIG. 1 is a cross sectional view of pressure relief valve 10 in a closed condition. Valve 10 comprises a two way pressure relief valve that allows fluid into or out of a system. That is relief valve 10 is operable to vent high pressure fluid from a system yet prevent fluid from leaking from the system under low pressure differential conditions. In addition, the pressure relief valve 10 is operable to allows fluid to enter the system to help equalize the internal and external system pressures if the internal pressure, in relation to the external pressure, becomes to low.

Figure 1A:
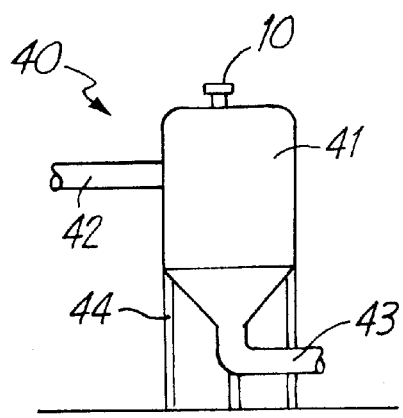
FIG. 1a is a pictorial view of a pneumatic conveying system with a storage container having the pressure relief valve of FIG. 1 therein.

Valve 10 includes a circular housing 12 for attachment of valve 10 to a conveying system 40 or the like. A bowl-shaped cover 12 extends over valve 10 to provide a rain cap. FIG. 1a illustrates how valve 10 can be mounted on a container hopper 41 in a conveying system 40. System 40 includes an inlet member 42 which connects to container hopper 41 which is supported by legs 44. A discharge chute 43 connects to the bottom of hopper container 41. Typically, conveying system 40 uses a fluid such as air to fluidize materials and transport the materials from one location to another. Although air is commonly used fluid gases or liquids are also suitable for use in conveying materials within a conveying system.

Valve 10 includes a first compression spring 16 which is mounted in housing 12 about a rod 14, which is threaded at both ends in order to receive nuts 17, 18 and 19 on one end and nuts 25 and 26 on the opposite end. Similarly, an identical compression spring 16a and a rod 14a is located on the opposite side of the housing 12. A first circular pressure plate 13 is resiliently mounted in housing 12 by compression springs 14a and 16a such that pressure plate 13 is normally maintained in the position shown in FIG. 1 by a first spring force generated by springs 16a and 14a. Although two springs 14a and 16a are shown to provide the spring force to resiliently support plate 13 more or less springs could be used. For example, a number of compression springs could be placed around the periphery of plate 13 to maintain a spring force on pressure plate 13 or a single large compression spring could be used to maintain plate 13 in the position shown. While pressure plate 13 is shown as planner, the pressure plate could take on other shapes as will be evident from the following description.

Pressure plate 13, which is movable in response to pressure differential forces there across, comprises a rigid circular member that extends across the housing 12 with pressure plate including a set of peripheral openings 13c and 13b which allow for vertical displacement of plate 13 along rods 14 and 14a.

FIG. 1 shows that one end of rod 14 extends through housing 12 so that nuts 25 and 26 can secure rod 14 to housing 12 to maintain rod 14 in a fixed condition. The other end of rod 14 includes nuts 17 and 18 which can be used to adjust the compression force on spring 16. That is, by rotating nut 18 one can displace nut 18 axially along rod 14, which can compress spring 16 and thus increase the force generated by compression spring 16. As rod 14a and spring 16a operates in an identical manner it will not be described herein.

Plate 13 is allowed to move vertically along vertical axis 21 but is restrained from doing so by springs 16 and 16a that generate a spring force that prevent plate 13 from moving upward unless the differential pressure forces can overcome the spring force. Located below pressure plate 13 is a first annular cantilevered sealing member 15 and a second annular cantilevered sealing member 30 that prevent downward movement of plate 13. In the embodiment shown the cantilevered sealing members arc concentrically positioned to provide the resistant support for further downward movement of plate 13. If the spring pressure on plate is required to be sufficiently high one can provide stops on rods 14 and 16. In the current embodiment nut 26 and nut 26a provide a mechanical stop to prohibit extreme downward displacement of plate 13 if the spring pressure force is increased. Under less extreme spring force conditions shown, the cantilevered sealing members 15 provide a resilient stop for plate 13 to limit downward displacement of pressure plate 13.

FIG. 1 shows the pressure relief valve in the closed condition with housing 12 supporting a first resilient cantilevered extension 15. The first resilient cantilevered extension 15 has an annular sealing surface 15a, which is shown in greater detail in FIG. 6. Annular sealing surface 15a engages the underside of pressure plate 13 to from a seal therebetween. Pressure plate 13, sealing member 15 and compression springs 16 comprise the embodiment that allows high pressure fluid to escape the system when a predetermined pressure is exceeded.

Thus in valve 10, the resilient cantilevered extension 15 has a base or support 15c on one end and a sealing surface 15a on the other end. The resilient cantilevered extension 15b tapers and angles inwardly so that even a slightly greater pressure, such as on the order of a pressure of an inch of water, on an inward side of cantilevered extension 15b produces sufficient lateral and radial forces on tapered extension 15 to thereby rotate and force sealing surface 15a into sealing engagement with pressure plate 13. The pressure plate 13 remains vertically displaceable against the force generated by springs 16 and 16a so that when the pressure differential across plate 13 generates a force that exceeds the spring force generated by springs 16 and 16a the seal between extension 15 and pressure plate 13 yields to allows high pressure fluid to escape from housing 11.

The second embodiment of the invention, which allows pressure equalization if the external system pressure exceeds the internal system pressure by a predetermined differential pressure, is also provided by an inner annular sealing arrangement. The inner annular scaling arrangement also includes pressure plate 13, a compression spring 33 and a resilient cantilevered extension 30. The pressure plate 13 is held in a second sealing arrangement by a rod 32 having threaded ends with one end secured by nuts 34 and 35 to provide a stop for compression spring 33. Compression spring 33, which is located around rod 32 has one end abutting against nut 34 and the other end abutting against the top central portion of plate 13 so that rod 32 is maintained in fixed position with respect to plate 13. The rod 33 also extends through an opening 13d to allow rod 32 to move downward along vertical axis 19 when the compression spring 33 is compressed.

Fixedly attached to the lower end of rod 32 is a circular plate 31 having a second resilient cantilevered extension 30 fixedly mounted around the periphery of plate 31. Plate 31 is further fixedly secured to the lower end of rod 32 by nuts 36 and 37. Thus plate 31 and sealing members 30 move as a unit. The second resilient cantilevered extension 30 is maintained in a sealing condition with the lower side of pressure plate 13 by adjusting the spring force of compression spring 33 which can be done by rotating nuts 34 and 35. The resilient cantilevered extension 30 includes an annular sealing surface 30a, which is identical to the sealing surface 15a on member 15. In operation of valve 12 in response to a lower internal pressure than an external pressure the compression spring 33 compresses allowing plate 31 and the second resilient cantilevered extension 30 to move downward as a unit away from pressure plate 13 to thereby break the seal. Breaking the seal allows fluid to enter the system past sealing area 30a Thus it will be envisioned that plate 31 and plate 13 move independent of one another and are controlled by different spring forces and by different differential pressure conditions.

Figure 5:
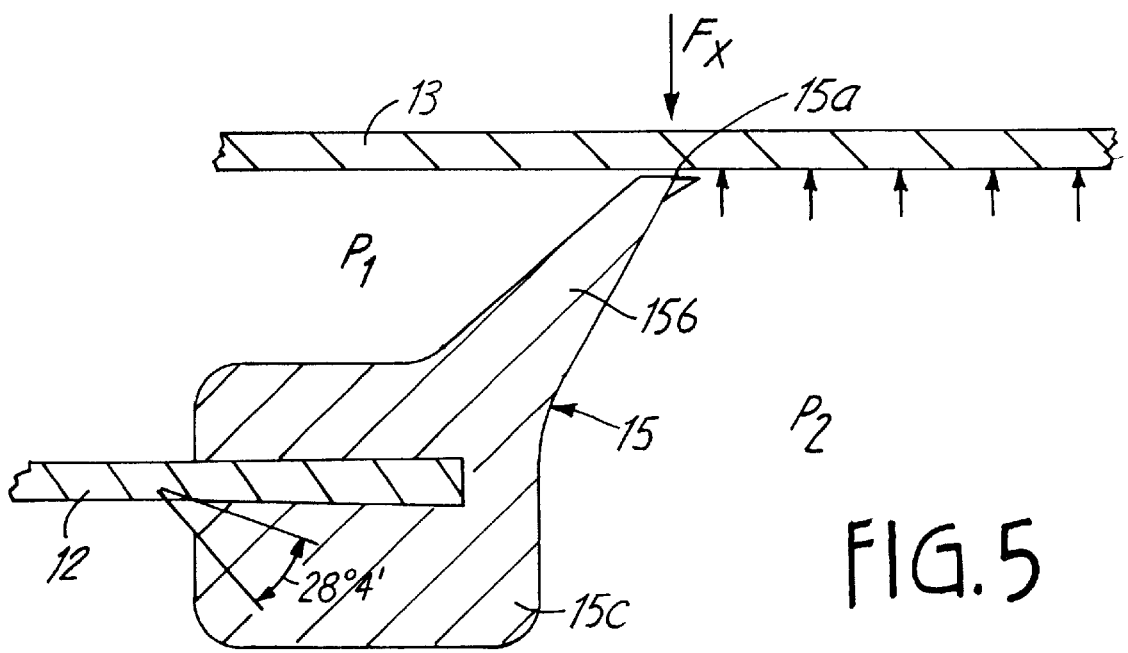
FIG. 5 shows a cross sectional view of a cantilevered seal in a sealing arrangement to prevent flow of fluid therepast.
Figure 6:
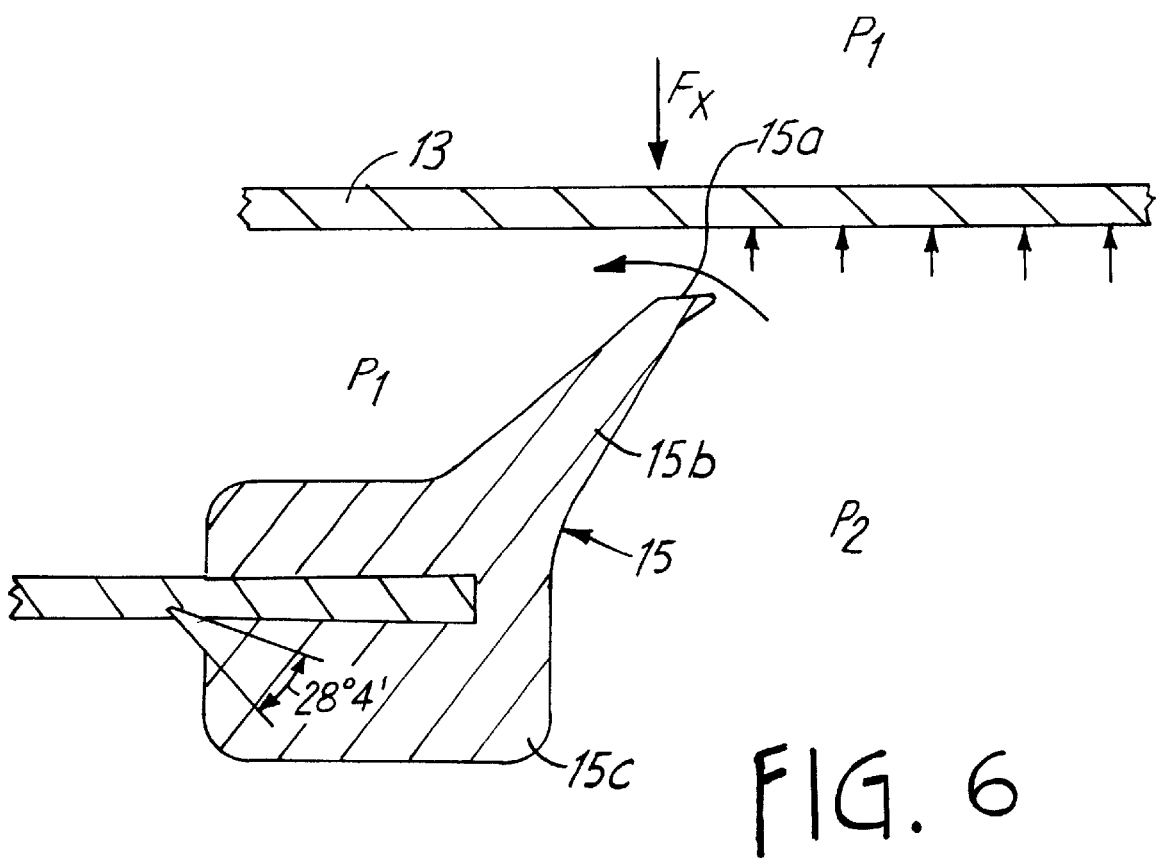
FIG. 6 shows a cross sectional view of the cantilevered seal of FIG. 5 in a non-scaling arrangement to allow flow of fluid therepast.

Referring to FIG. 5 and FIG. 6 there is shows an isolated cross sectional view of resilient cantilevered extension 15 and a portion of pressure plate 13 in two different positions. FIG. 5 shows resilient cantilevered extension 15b with the annular sealing surface 15a in sealing engagement with the pressure plate 13. The resilient cantilevered extension 15b has a massive support 15c which is fixedly supported by housing 12. The pressure on one side of resilient cantilevered extension 15 is designate by $P_1$ and the pressure on the opposite side is designated by $P_2$, By use of a resilient material such as rubber for extension 15b I provide a low pressure differential sealing arrangement. That is, the sealing area 15a is cantilevered extended from the more massive support 15c by extension 15b which provides for response to conditions where pressure $P_2$ is only slight grater than $P_1$. Yet, the annular resilient cantilevered extensions 30 has sufficient integrity to withstand rupture when the internal pressure substantially exceeds the external pressure.

FIG. 5 shows that plate 13 is held in position by a spring force $F_x$. The cantilevered extension of member 15b radially inward toward the higher pressure $P_2$ provides a large area for pressure engagement and create a counter clockwise torque to bring sealing area 15a into sealing engagement with pressure plate 13. In addition, the radially inward projection of member 15b provides a further restraint to prevent cantilevered extension 15b from being blown out when the pressure increases since the pressure forces also need to overcome the resilient forces that prevent radially expansion of extension 15b. It has been found that the cantilevered extending members 15 can maintain a pressure seal between plate 13 and sealing area 15a even though the internal pressure $P_2$ may be only slightly greater than the external pressure $P_1$. That is, I have found that with the cantilevered extension 15 slight pressure differentials are sufficient to maintain a seal.

FIG. 6 shows the condition where the plate 13 has been displaced upward by the differential pressure fore $P_2-P_1$ which is sufficient to overcome the spring force $F_x$. In this condition seal 15a separates from pressure plate 13 allowing fluid to escape past the sealing surface 15a.

Figure 2:
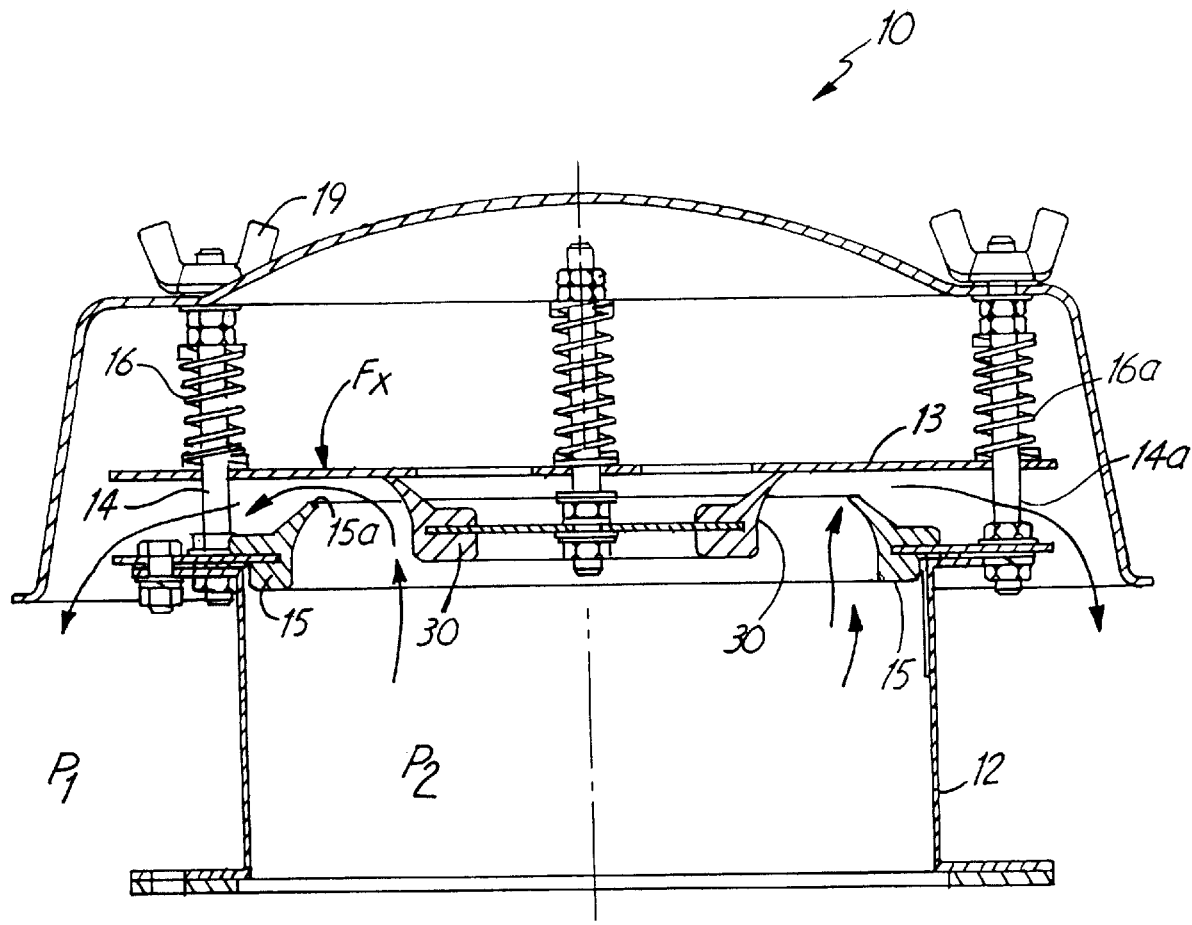
FIG. 2 is a cross sectional view of the pressure relief valve of FIG. 1 in the pressure relief mode when the difference between the internal system pressure and the external system pressure has exceeded a first predetermined differential pressure.

In order to appreciate the operation of pressure relief valve 10 in the pressure relief mode reference should be made to FIG. 2 which shows pressure plate 13 which has been displaced vertically upward by compressing springs 16 and 16a. The internal system pressure is represented by $P_2$ and the external system pressure is represented by $P_1$. If the internal pressure $P_2$ is somewhat greater than an external pressure $P_1$ the differential pressure $P_2-P_1$ forces first sealing surface 15a into a sealing engagement with pressure plate 13. However, should the internal pressure $P_2$ become substantially greater than the external pressure $P_1$ the pressure relief valve 10 relieves the high internal pressure $P_2$ by opening to discharge fluid from housing 12.

FIG. 2 shows pressure plate 13 displaced against the first spring force Fx when a first pressure force generated by the difference between the internal pressure $P_2$ and the external pressure $P_1$ exceeds the first spring force. The pressure forces displace pressure plate 13 away from first sealing surface 15a to allow high pressure fluid to escape from housing 12 as indicated by the flow arrows. Consequently, valve 10 functions to reduce the internal pressure $P_2$ and thus prevents a rupture of the system connected to housing 10 if the internal pressure external pressure difference should exceed a predetermined pressure differential.

It will be noted that the pressure relief valve 10 is operable to relieve pressure by displacement of pressure plate 13 upward away from the sealing surface 15a. Thus in one embodiment of the invention the outer annular cantilevered extension 15 cooperates with pressure plate 13 to provide a sealing arrangement but when pressure plate 13 is displaced upward by pressure differential forces that overcome the spring force excess pressure and fluid can be vented from housing 12 to provide pressure relief to the system. Thus, FIG. 2 shows a cross sectional view of the pressure relief valve 10 of FIG. 1 in the pressure relief mode when the difference between the internal system pressure $P_2$ and the external system pressure $P_1$ has exceeded a predetermined differential pressure value.

Figure 3:
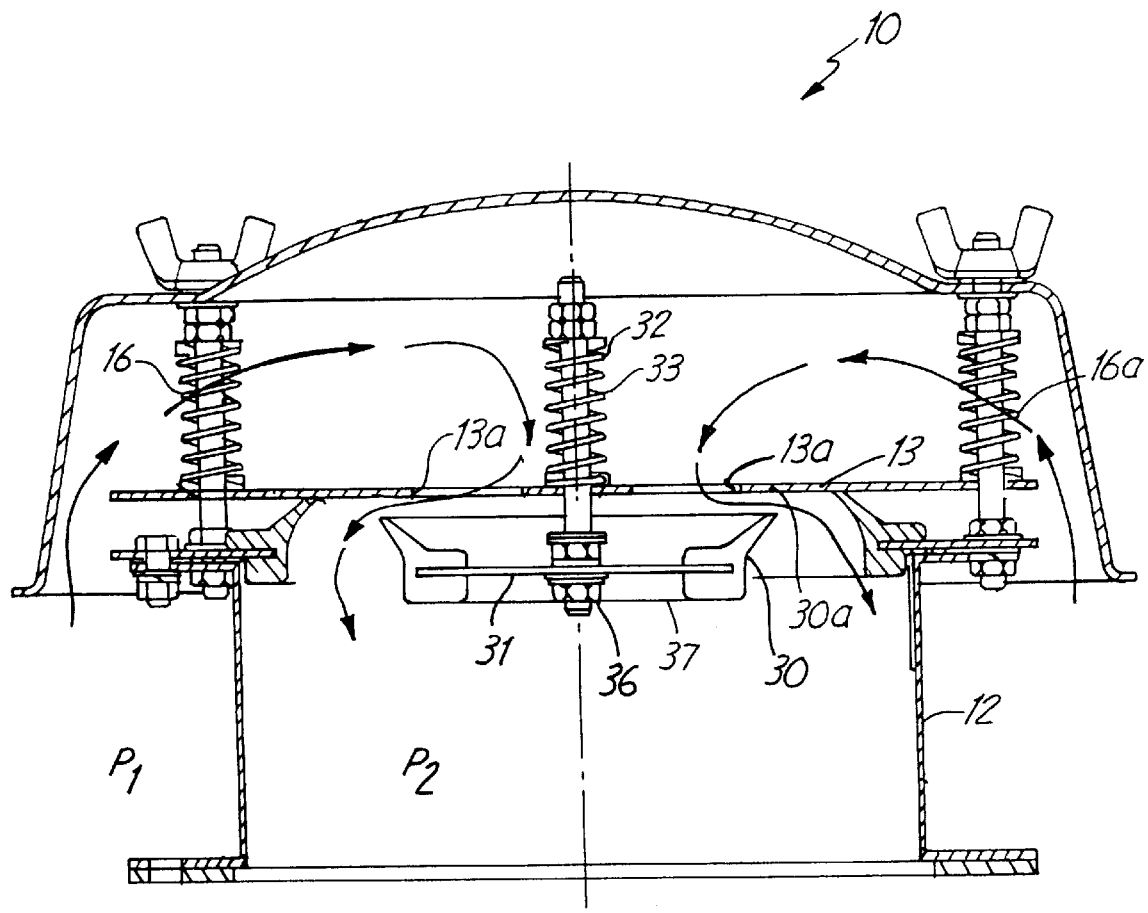
FIG. 3 is a cross sectional view of the pressure relief valve of FIG. 1 in the pressure equalization mode that allows fluid into the system to equalize the internal and external system pressures when a second differential pressure is exceeded.

In a further embodiment of the present invention one can include a pressure equalizing sealing arrangement that prevents the difference between the internal system pressure and the external system pressure from becoming to high if the internal pressure should decrease rapidly, which might cause collapse of the container. FIG. 3 illustrates the sealing arrangement that provides for internal pressure equalizing by allowing fluid to flow into the housing 12. FIG. 3 shows that plate 13 is in the position shown in FIG. 1 with the springs 16 and 16a coacting with seal 15 to hold plate 13 in position. If the internal pressure $P_2$ should decrease sufficiently far below the external pressure $P_1$ in some applications it could cause collapse of the container attached to housing 12. With the present invention when the internal pressure $P_2$ is greater than an external pressure $P_1$ the internal pressure forces the second sealing surface 30 into a sealing engagement with pressure 13. However, when the internal pressure $P_2$ is less than the external pressure $P_1$ and the pressure differential exceeds a second value the second pressure plate 31 is displaceable away from first plate 13. That is, when a second pressure force generated by difference between the external pressure $P_1$ and the internal pressure $P_2$ exceeds the second spring force generated by compression spring 33 it cause plate 31 and annular seal 30 to move vertically downward to thereby allow second sealing surface 30a to unseat from pressure plate 13 and sealing area 30a. Consequently, fluid flows into housing 12 through openings 13a in pressure plate 13 and the gap between pressure plate 13 and sealing surface 30. Thus FIG. 3 shows a cross sectional view of the pressure relief valve of FIG. 1 in the pressure equalization mode that allows fluid into the system to equalize the internal and external system pressures when the internal pressure $P_2$ is less than the external pressure $P_1$. With the present invention both flow modes can be incorporated in the same pressure relief valve to thereby provide a pressure relief valve that vents excessive internal pressure while still allowing internal pressure to be equalized with external if the external system pressure should substantially exceed the internal system pressure.

Figure 4:
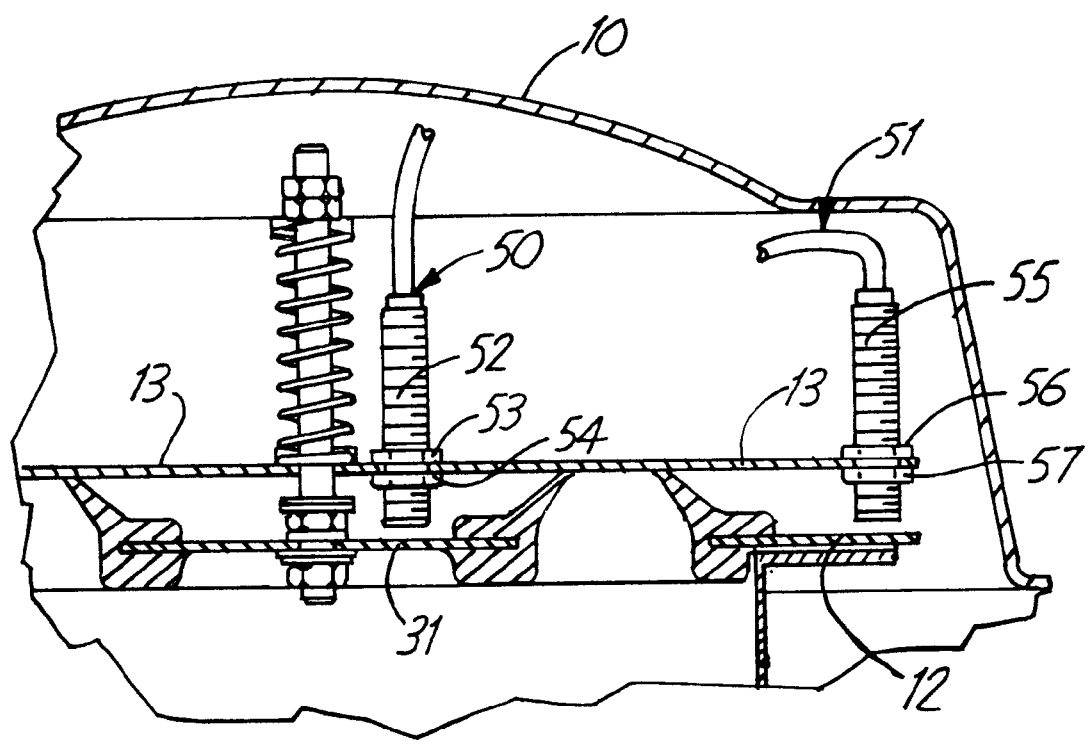
FIG. 4 is a cross sectional view of the pressure relief valve of FIG. 1 showing position sensors for monitoring the displacement of pressure plates in response to changing pressure condition.

FIG. 4 is a cross sectional view of the pressure relief valve of FIG. 1 showing position sensors for monitoring the displacement of pressure plates 13 and 31 in response to changing pressure condition. That is, with the present invention both pressure plate 13 and pressure plate 31 are restrained from movement by compression springs. Because the compression springs will yield in accordance with the force therein the pressure plates 31 and 13 will move slightly in response to changes in pressure. However, movement of pressure plates 13 or 31 over small distance is acceptable since the cantilevered extension 15 and 30 can flex to retain themselves in sealing engagement with pressure plate 13. However, should the operator need to know if the system is approaching a condition where either the relief valve will vent fluid to the atmosphere or fluid would be allowed to enter the system to equalize the pressure the operator can use the position sensors for such information.

FIG. 4 shows first position sensor 50 held in position on plate 13 by nuts 53 and 54. The end of the position sensor is spaced from pressure plate 31 with the amount of the gap between plate 31 and position sensor 52 generating a signal representing of the space which can be correlated to the pressure on the system to determine it a condition pressure equalization is being approached.

Similarly, a second position sensor 55 attaches to plate 13 with a nut 56 and a nut 57 holding position sensor 55 on plate 13. The end of position sensor 55 is spaced from housing 12 with the gap producing a signal representative of the spacing of housing 12 from position sensor 55. In operation the pressure plate 13 may move slightly upward without breaking free of seals 15a and 30a. Should this occur the position sensor 55 would note the change in spacing from housing 12 and a signal could be sent to an operator to warn the operator of the condition where by the internal pressure is reaching a position where the pressure relief valve erupts to discharge fluid therethrough.

I claim:

1. A pressure relief valve for maintaining a sealing condition under a first pressure differential condition and for breaking the sealing condition when the pressure differential exceeds a second pressure differential condition comprising:

a housing;

a spring mounted in said housing;

a plate mounted in said housing, said plate maintained in a first position by a force generated by said spring;

a resilient cantilevered extension mounted in said housing, said resilient cantilevered extension having a base on one end and a sealing surface on the other end with said resilient cantilevered extension angled inwardly so that a greater pressure on an inward side of said cantilevered extension produces a lateral and a radial force on said extension to thereby force said sealing surface into sealing engagement with said plate, said plate displaceable against the force generated by said spring when the pressure differential across said plate exceeds the second pressure differential condition to thereby allow high a pressure fluid to escape from said housing.

2. The pressure relief valve of claim 1 wherein said resilient cantilevered extension is annular.

3. The pressure relief valve of claim 2 wherein said resilient cantilevered extension is rubber.

4. The pressure relief valve of claim 3 wherein said spring is a compression spring with said compression spring adjustable to increase the force on said plate.

5. The pressure relief valve of claim 4 including a stop for restraining said plate from displacement toward said resilient cantilevered extension.

6. The pressure relief valve of claim 5 wherein said plate includes a first position sensor to provide a warning of pressure changes in said housing.

7. The pressure relief valve of claim 6 wherein said plate includes a second position sensor to provide a warning of a pressure changes in said housing.

8. The pressure relief valve of claim 7 wherein said resilient cantilevered extension decreases in cross sectional area toward said sealing surface.

9. The pressure relief valve of claim 1 wherein the first pressure differential condition is less than a pressure head of one inch of water.

10. A two way pressure relief valve for preventing fluid from leaking from a system when an internal system pressure is slightly higher than an external system pressure while allowing fluid to enter the system if the external system pressure exceeds the internal system pressure comprising:

a housing;

a first plate mounted in said housing, said first plate maintained in a first position by a first spring force;

a first resilient cantilevered extension mounted in said housing, said first resilient cantilevered extension having a sealing surface so that when an internal pressure is greater than an external pressure the internal pressure forces said first sealing surface into a sealing engagement with said first plate, said first plate displaceable against the first spring force when a first pressure force generated by the difference between the internal pressure and the external pressure exceeds the first spring force to thereby displace said first plate from said first sealing surface to allow fluid to escape from said housing and thereby relieve the internal pressure;

a second plate mounted in said housing;

a second resilient cantilevered extension mounted in said housing, said second resilient cantilevered extension having a support on one end, said support on said second extension secured to said second plate, said second resilient cantilevered extension having a second sealing surface so that when the internal pressure is greater than an external pressure the internal pressure forces said second sealing surface into a sealing engagement with said first plate, said second plate displaceable away from said first plate when a second pressure force generated by difference between the external pressure and the internal pressure exceeds the second spring force to thereby allow said second sealing surface to unseat from said first plate to allow fluid under the external pressure to flow into the system.

11. The two way pressure relief valve of claim 10 wherein said first resilient cantilevered extension is annular.

12. The two way pressure relief valve of claim 11 wherein said second resilient cantilevered extension is annular.

13. The two way pressure relief valve of claim 12 wherein the second resilient cantilevered extension is position concentrically within said first second resilient cantilevered extension.

14. The two way pressure relief valve of claim 10 wherein the first plate includes a position sensor to monitor displacement of said first plate.

15. The two way pressure relief valve of claim 14 wherein the first plate includes a second position sensor for monitoring of the displacement of said second plate with respect to said first plate.

16. The two way pressure relief valve of claim 10 wherein each of the first and the second resilient extension members are rubber.

17. The two way pressure relief valve of claim 10 including a first threaded fastener for compressing the first spring to thereby increase the first spring force.

18. The two way pressure relief valve of claim 17 including a second threaded fastener for compressing the second spring to thereby increase the second spring force.

19. The two way pressure relief valve of claim 10 including a hopper bin for supporting said pressure relief valve with the external pressure being an atmospheric pressure.

20. The two way pressure relief valve of claim 10 wherein the fluid is air.

21. The two way pressure relief valve of claim 10 wherein the fist resilient cantilevered extension and the second resilient cantilevered extension taper toward their respective sealing areas.

* * * * *